United States Patent
Umezawa et al.

[11] 3,862,159
[45] Jan. 21, 1975

[54] 5-(HALOALKYL) PICOLINIC ACID AND DERIVATIVES

[75] Inventors: Hamao Umezawa; Tomio Takeuchi, both of Tokyo; Koichi Miyano, Omiya; Hiroaki Hamano, Higashi-Murayama; Wataru Tanaka, Hoya, all of Japan

[73] Assignee: Zaiden Hojin Biseibutsu Kagaku Kenkyu Kai, Tokyo, Japan

[22] Filed: Feb. 6, 1973

[21] Appl. No.: 330,027

[30] Foreign Application Priority Data
Feb. 7, 1972 Japan............................. 47-12840
May 30, 1972 Japan............................. 47-52956
June 1, 1972 Japan............................. 47-53785

[52] U.S. Cl..... 260/295 R, 260/240 D, 260/290 Hl, 260/297 R, 424/266
[51] Int. Cl............................................ C07d 31/36
[58] Field of Search................................ 260/295 R

[56] References Cited
UNITED STATES PATENTS
2,766,251  10/1956  Brown............................ 260/295 R
2,868,797  1/1959  Cislak ............................ 260/295 R

OTHER PUBLICATIONS
Klingsberg, Pyridine And Its Derivatives, Part Two, Pages 97–103, 124–27 Interscience Publishers (1961) QD 401 k5 C.2
Steiner et al. Chem. Abstracts, Vol. 59, No. 1, Pages 562-f to 563-b, July 8, 1963
Klingsberg, Pyridine And Its Derivatives, Part Three, Pages 182–83, Interscience Publishers, 1962 QD 401 K5 C.2

*Primary Examiner*—Alan L. Rotman
*Attorney, Agent, or Firm*—Schuyler, Birch, Swindler, McKie & Beckett

[57] ABSTRACT

A 5-(haloalkyl)picolinic acid represented by the general formula,

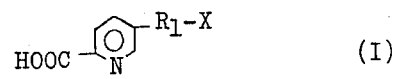 (I)

wherein $R_1$ represents an alkylene group having 3 to 6 carbon atoms and X represents a halogen atom, provided that the halogen atom is attached to the terminal carbon atom of the carbon chain or to the carbon atom at position 3' in the case of a four-carbon chain, is a novel compound useful as a hypotensive agent. The said novel compound is obtained by reacting a 2-methyl-5-(haloalkyl)-pyridine represented by the general formula,

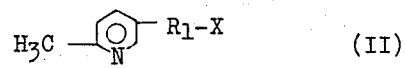 (II)

wherein $R_1$ and X have the same meaning as defined above, a. with a peroxide to form a 2-methyl-5-(haloalkyl)pyridine-N-oxide, converting the resulting N-oxide to a 2-hydroxymethyl-5-(haloalkyl)pyridine ester by reaction with a carboxylic acid anhydride, hydrolyzing the resulting ester to a 2-hydroxymethyl-5-(haloalkyl)-pyridine, and oxidizing the resulting compound with an oxidizing agent; or b. with benzaldehyde in the presence of a dehydrating agent to form a 2-styryl-5-(haloalkyl)-pyridine, and oxidizing the resulting styryl derivative with an oxidizing agent; or c. with selenium dioxide to effect oxidation.

3 Claims, No Drawings

5-(HALOALKYL) PICOLINIC ACID AND DERIVATIVES

This invention relates to a novel 5-(haloalkyl)-picolinic acid represented by the general formula (I) shown below and a process for producing same.

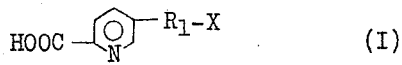

wherein $R_1$ represents an alkylene group having 3 to 6 carbon atoms and X represents a halogen atom, provided that the halogen atom is attached to the terminal carbon atom of the carbon chain or to the carbon atom at position 3' in the case of a four-carbon chain.

An object of this invention is to provide a 5-(haloalkyl)picolinic acid which is a novel compound represented by the above-said formula (I) and is useful as a hypotensive agent.

Another object of this invention is to provide a process for producing a novel 5-(haloalkyl)picolinic acid represented by the aforementioned formula (I), which comprises reacting a 2-methyl-5-(haloalkyl)-pyridine represented by the general formula

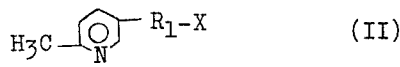

(wherein $R_1$ and X have the same meanings as defined above), a. with a peroxide to form a 2-methyl-5-(haloalkyl)-pyridine-N-oxide, converting the resulting-N-oxide to 2-hydroxymethyl-5-(haloalkyl)pyridine ester by reaction with a carboxylic acid anhydride, hydrolyzing the resulting ester to 2-hydroxymethyl-5-(haloalkyl)pyridine, and oxidizing the resulting compound with an oxidizing agent; or b. with benzaldehyde in the presence of a dehydrating agent to form a 2-styryl-5-(haloalkyl)-pyridine, and oxidizing the resulting styryl derivative with an oxidizing agent; or c. with selenium dioxide to effect oxidation.

The process of this invention may be represented by the following reaction formulas.

(a) 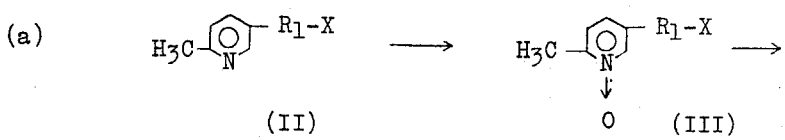

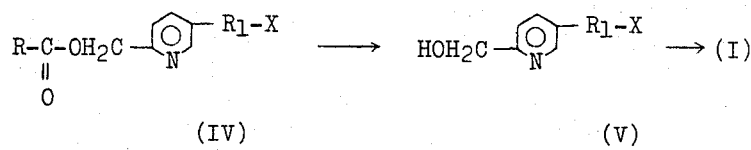

(b) 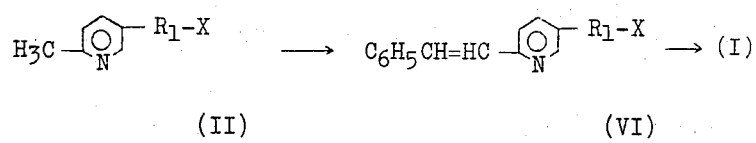

(c) 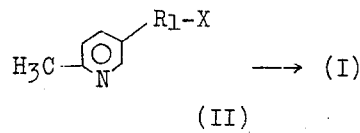

(Wherein $R_1$ and X have the same meanings as defined above, and R represents a lower alkyl group, a lower haloalkyl group, or a phenyl group).

The lower alkyl groups represented by R in the above formula include methyl group, ethyl group, n-propyl group, isopropyl group, butyl group, isobutyl group; and the lower haloalkyl groups represented by R include chloromethyl group, bromomethyl group, chloroethyl group, bromoethyl group, etc.

The process of this invention is explained below in further detail.

In method (a), at first a 2-methyl-5-(haloalkyl)pyridine (II) is dissolved in, for example, glacial acetic acid, then admixed with hydrogen peroxide, peracetic acid, perbenzoic acid or perphthalic acid, and allowed to react at a temperature of, for example, 50° to 100°C. for about 2 to 10 hours to obtain an oily 2-methyl-5-(haloalkyl)pyridine-N-oxide (III) in good yields. To the resulting N-oxide (III), is added an acid anhydride, such as acetic anhydride, propionic anhydride, butyric anhydride, benzoic anhydride, or monochloroacetic anhydride, in slight excess of the theoretical amount. The mixture is allowed to react under reflux for about 30 minutes, then freed from the acid anydride and the by-produced acid, and the residue is distilled under reduced pressure to obtain 2-hydroxy-5-(haloalkyl)pyridine ester (IV). The ester (IV) can be easily hydrolyzed according to a usual ester decomposing procedure, that is, by heating with an acid or by reacting with an alkali at room temperature or with heating, to yield a 2-hydroxymethyl-5-(haloalkyl)prizine (V).

The 2-hydroxymethyl-5-(haloalkyl)pyridine (V) thus obtained is dissolved in an organic solvent such as tert-butanol, acetone, or dioxane. To the solution, is added dropwise, for example, an aqueous solution of potassium permanganate, dichromic acid, or potassium dichromate with cooling, e.g., at around 0° to 10°C., and allowed to react at a temperature within said temperature range or at room temperature for 30 minutes to 2 hours. The main reaction product is extracted with an organic solvent such as chloroform, 1,2-dichloroethane, ether, or benzene, and the extract is dried and freed from the solvent by distillation. The residue is recrystallized from a suitable solvent such as, for example, hexane or 1,2-dichloroethane to obtain the intended 5-(haloalkyl)picolinic acid (I). When an oxidizing agent such as lead tetraacetate, manganese dioxide, or a complex of chromic anhydride and pyridine was used, there is formed as an intermediate a 2-formyl-5-(haloalkyl)pyridine which can be further oxidized with silver oxide or the like to yield the intended 5-(haloalkyl)picolinic acid (I).

In method (b), a 2-methyl-5-(haloalkyl)-pyridine (II) is reacted with benzaldehyde in the presence of a carboxylic acid anhydride such as acetic anhydride and propionic anhydride or a combination of a carboxylic acid anhydride with an alkali metal carboxylate such as potassium acetate and sodium acetate, or in the presence of a dehydrating agent such as polyphosphoric acid and the like, at 100° to 200°C. for about 20 to 50 hours. After completion of the reaction, the reaction mixture is freed from the unreacted benzaldehyde by steam distillation, and the residue is extracted with ether. The extract solution is concentrated and further distilled under reduced pressure to obtain a purified 2-styryl-5-(haloalkyl)pyridine (VI) which can be oxidized in the same manner as in method (a) to yield the intended 5-(haloalkyl)picolinic acid (I).

In method (c), selenium dioxide is added portionwise to a 2-methyl-5-(haloalkyl)pyridine (II) in a solvent such as dioxane and xylene, or without using a solvent. After completion of the addition, the mixture is heated at 100° to 200°C. for about 3 to 10 hours to complete the reaction. In order to remove insoluble matters, the reaction mixture is filtered as such when a solvent was used for the reaction, or after dilution with a solvent such as dioxane or ethyl acetate when no solvent was used. The filtrate is concentrated under reduced pressure to precipitate the intended 5-(haloalkyl)picolinic acid (I) in the form of crystals which are collected by filtration and recrystallized from a suitable solvent such as n-hexane or the like to yield a purified product.

The 5-(haloalkyl)picolinic acid of this invention is a novel compound having a distinguished potency as a hypotensive agent.

The efficacy of the compound of this invention is mentioned below with reference to Experimental

EXAMPLE

EXPERIMENTAL EXAMPLE 1

Hypotensive action on spontaneously hypertensive rat 5-(Haloalkyl)picolinic acids obtained by the process of this invention and fusaric acid as a control were orally administered to spontaneously hypertensive rats (distributed by Council for the Spontaneously Hypertensive Rat) which had been fitted with a chronic cannula, and the blood pressure was measured at definite intervals. The average of minimum blood pressures measured on several rats divided by the initial blood pressure and expressed in percentage was referred to as degree of hypotensive effect. Further, the time required from the beginning of administration of a pharmaceutical preparation until the blood pressure restored its initial value (persistence time) was measured. The results obtained were as shown in Table 1. $LD_{50}$ of the compounds of this invention for a normal mouse was also shown in Table 1. The measurements were carried out according to the method of I. Nagatsu, T. Nagatsu, K. Mizutani, H. Umezawa, M. Matsuzaki and T. Taniguchi [Nature, 230, 381 (1971)].

TABLE 1

Hypotensive effect of 5-(haloalkyl)picolinic acids on hypertensive rats, persistence time of the effect (administrative dose, 25 mg/kg), and $LD_{50}$ for a normal mouse

| Exp. No. | Substituent group at position 5 of 5-(haloalkyl)-picolinic acid | Degree of hypotensive effect*1 (%) | Persistence time*2 (hour) | Number of cases | $LD_{50}$ (mg/kg) |
|---|---|---|---|---|---|
| 1 | $-(CH_2)_3Cl$ | 73.0 | 48 | 6 | 500±50 |
| 2 | $-(CH_2)_4Cl$ | 72.0 | 72 | 5 | 470±85 |
| 3 | $-(CH_2)_5Cl$ | 82.5 | 72 | 5 | 530±95 |
| 4 | $-(CH_2)_6Cl$ | 93.0 | 72 | 4 | 650±50 |
| 5 | $-(CH_2)_3Br$ | 70.0 | 72 | 4 | 500±50 |
| 6 | $-(CH_2)_4Br$ | 83.0 | 72 | 4 | 600±50 |
| 7 | $-(CH_2)_4F$ | 68.0 | 72 | 6 | 350±50 |

| Exp. No. | Substituent group at position 5 of 5-(haloalkyl)-picolinic acid | Degree of hypotensive effect*1 (%) | Persistence time*2 (hour) | Number of cases | LD$_{50}$ (mg/kg) |
| --- | --- | --- | --- | --- | --- |
| 8 | -(CH$_2$)$_5$F | 73.5 | 24 | 6 | 400±50 |
| 9 | -(CH$_2$)$_2$CHCH$_3$<br>\|<br>Cl | 79.5 | 72 | 5 | 278±38 |
| 10 | Fusaric acid<br>-(CH$_2$)$_3$CH$_3$<br>(Control) | 82.5 | 72 | 4 | 360±30 |

Note: *1 Degree of hypotensive effect = Average minimum blood pressure/Initial blood pressure × 100 (%) *2 Time required from the beginning of administration of a pharmaceutical preparation until the blood pressure restores its initial value.

The results obtained in the above-mentioned Experimental Example 1 are illustrative of the distinguished hypotensive effect of the present 5-(haloalkyl)picolinic acids.

The 2-methyl-5-(haloalkyl)pyridine for use as a starting material in the process of this invention can be prepared by reacting 2-methyl-5-ethynylpyridine with a Grignard compound, a lower alkyl metal compound, sodium hydride, or an alkali metal amide, then reacting the reaction product with ethylene oxide, an aliphatic aldehyde, or an aliphatic ketone, reducing the reaction product to a 2-methyl-5-(hydroxyalkyl)pyridine, and reacting the resulting hydroxyalkyl compound with p-toluenesulfonyl chloride in anhydrous pyridine for a long period of time, or reacting the intermediate tosylate with a halide such as lithium chloride or lithium bromide, or directly halogenating said hydroxyalkyl compound with a halogenating agent such as thionyl chloride in pyridine.

Alternatively, a 2-methyl-5-(chloroalkyl)-pyridine may be obtained by reacting 2-methyl-5-ethynylpyridine with a compound represented by the general formula,

R - M (wherein R represents an amide group, a lower alkyl group, or a phenyl group, and M represents an alkali metal atom) or with a Grignard compound, further reacting the resulting product with a compound represented by the general formula, Cl — R$_1$ — X' wherein X' represents Br or OTs (Ts stands for a tosyl group), and R$_1$ represents an alkylene group having 3 to 6 carbon atoms, and catalytically reducing the reaction product in a usual way, e.g., in the presence of a catalyst such as palladium or Raney nickel. The said 2-methyl-5-(chloroalkyl)pyridine may be converted to a corresponding 2-methyl-5-(bromoalkyl)pyridine or 2-methyl-5-(fluoroalkyl)pyridine by reaction with hydrobromic acid or by heating with potassium fluoride in diethylene glycol.

The invention is illustrated below in detail with reference to Examples.

EXAMPLE 1

Synthesis of 5-(3'-chloro-n-propyl)picolinic acid 2.73 Grams of 2-methyl-5-(3'-chloro-n-propyl)-pyridine in 10 ml of acetic acid is heated with 1.6 ml of 30 percent-hydrogen peroxide at 70° to 80°C. for 3 hours. Additional 1.2 ml of 30 percent-hydrogen peroxide is added to the reaction mixture and heated at 70° to 80°C. for further 9 hours. After completion of the reaction, the reaction mixture is concentrated under reduced pressure to ⅓ the original volume, diluted with water to restore the original volume, again concentrated to ⅓ the original volume, and extracted 5 times with each 10 ml of ether. The ether layer was added with anhydrous potassium carbonate to remove the acetic acid, and then freed from the ether by distillation to obtain quantitatively 2-methyl-5-(3'-chloro-n-propyl)pyridine-N-oxide in the form of a pale yellow oil (a strong absorption due to N-oxide appears at $\nu$ 1270 cm$_-^1$ in IR spectrum). The N-oxide is dissolved in 1 ml of acetic anhydride and added dropwise to 4 g of acetic anhydride which has been refluxed with heating and stirring. After completion of the addition, the mixture is kept under reflux with stirring for further 20 minutes and freed from the acetic anhydride under reduced pressure. Crude 2-acetoxymethyl-5-(3'-chloro-n-propyl)pyridine is obtained as a brownish black oil (strong absorption bands due to an ester appear at $\nu$ 1735 cm$_-^1$ and $\nu$ 1220 cm$_-^1$ in IR spectrum).

To the oily residue, is added 20 ml of concentrated hydrochloric acid, and refluxed for 3 hours. The reaction mixture is concentrated under reduced pressure to ½ the volume, made alkaline with aqueous ammonia under ice-cooling, and extracted three times with 50 ml of ether. The ethereal layer is dried over anhydrous potassium carbonate and freed from the ether by distillation to obtain 2.26 g of an oily residue, pale black. To this unpurified 5-(3'-chloro-n-propyl)-2-hydroxymethylpyridine, is added 5 ml of water, followed by gradual, dropwise addition of a solution of 2.8 g of potassium permanganate in 90 ml of water, while being stirred vigorously and cooled in ice. After completion of the dropwise addition, stirring is continued for one hour at 0°C. To the mixture, is added 1 ml of methanol to decompose the excess potassium permanganate and stirred at 50°C. for 20 minutes.

The precipitated manganese dioxide is collected by filtration and washed thoroughly with 100 ml of boiling water. The filtrate and washings are combined, adjusted to pH 5 with dilute hydrochloric acid, concentrated under reduced pressure to 20 ml, and extracted four times with 40 ml of ether. The ethereal layer is freed from the ether to obtain crystals of 5-(3'-chloro-n-propyl)picolinic acid, which are recrystallized from a mixed solvent, n-hexane: ligroin = 2 : 1, to obtain 0.82 g of colorless crystals having a melting point of 127°– 128°C.

Elementary analysis:

|  | Calculated ($C_9H_{10}NO_2Cl$) | Found |
|---|---|---|
| C % | 54.15 | 54.00 |
| H % | 5.05 | 5.01 |
| N % | 7.02 | 7.27 |

In a similar manner as above, compounds shown in Table 2 were synthesized.

After completion of the reaction, the acetic anhydride is removed from the reaction mixture by distillation under reduced pressure to obtain 2-acetoxymethyl-5-(4'-chloro-n-butyl)pyridine. This base is dissolved in 50 ml of concentrated hydrochloric acid, refluxed for 3 hours, cooled, made slightly alkaline with aqueous ammonia, and extracted with ether. The ethereal layer is dried over potassium carbonate and freed from the ether by distillation. Oily 2-hydroxymethyl-5-(4'-chloro-n-butyl)pyridine is obtained.

To 25 ml of benzene containing 236 g of lead tetraacetate, while being refluxed with stirring, is added dropwise 1.06 g of the above-obtained 2-hydroxymethyl-5-(4'-chloro-n-butyl)pyridine. After completion of the addition, the mixture is refluxed with Table 2

| Starting material 2-Methyl-5-haloalkylpyridine | End product 5-Haloalkyl-picolinic acid | Yield (%) | Melting point (°C.) | Formula | Analysis (%) Found (calculated) C | H | N |
|---|---|---|---|---|---|---|---|
| 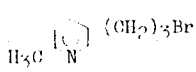 | 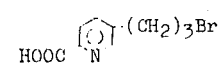 | 26 | 122 – 123 | $C_9H_{10}NO_2Br$ | 44.12 (44.29) | 4.11 (4.13) | 6.0? (5.74) |
| 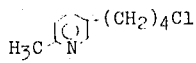 | 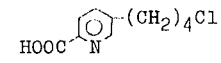 | 38 | 104 – 105 | $C_{10}H_{12}NO_2Cl$ | 56.44 (56.21) | 5.71 (5.66) | 6.60 (6.56) |
| 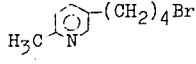 | 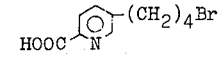 | 29 | 106 – 107 | $C_{10}H_{12}NO_2Br$ | 46.29 (46.53) | 4.67 (4.69) | 5.65 (5.43) |
| 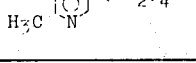 | 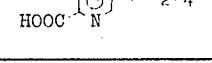 | 45 | 100 – 101 | $C_{10}H_{12}NO_2F$ | 60.67 (60.90) | 6.11 (6.13) | 7.34 (7.10) |
| 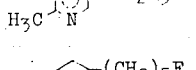 | 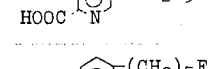 | 47 | 113 – 114 | $C_{11}H_{14}NO_2Cl$ | 58.21 (58.03) | 6.23 (6.02) | 6.19 (6.15) |
| 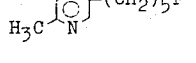 | 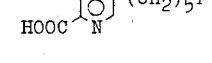 | 42 | 110 – 111 | $C_{11}H_{14}NO_2F$ | 62.66 (62.54) | 6.59 (6.68) | 6.58 (6.63) |
| 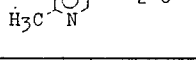 | 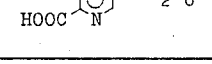 | 48 | 103 – 104 | $C_{12}H_{16}NO_2Cl$ | 59.55 (59.63) | 5.80 (6.67) | 6.02 (6.59) |
| 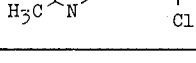 | 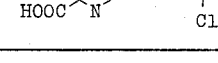 | 40 | 114 – 115 | $C_{10}H_{12}NO_2Cl$ | 56.09 (56.21) | 5.63 (5.66) | 6.56 (6.72) |

EXAMPLE 2

Synthesis (1) of 5-(4'-chloro-n-butyl)-picolinic acid

To 12.5 g of 2-methyl-5-(4'-chloro-n-butyl)-pyridine dissolved in 60 ml of acetic acid, is added dropwise 18 ml of 30 percent-hydrogen peroxide, and the mixture is heated at 70° to 80°C. for 10 hours.

After completion of the reaction, the excess hydrogen peroxide is decomposed with sodium bisulfite, and the reaction mixture is extracted with ether. The ethereal layer is washed with an aqueous solution of sodium carbonate, then with water, dried over anhydrous sodium sulfate, and freed from the ether by distillation to obtain oily 2-methyl-5-(4'-chloro-n-butyl)pyridine-N-oxide. The resulting N-oxide is added to 60 ml of acetic anhydride and refluxed with heating for one hour.

stirring for 45 minutes, then allowed to stand, and the precipitated lead diacetate is separated by filtration. The filtrate is washed with water, freed from the acetic acid with potassium carbonate, and then freed from the benzene by distillation under reduced pressure to obtain 0.62 g of 2-formyl-5-(4'-chloro-n-butyl)pyridine.

This aldehyde dissolved in ethyl alcohol (6 ml) is added dropwise, with stirring at room temperature, to a mixture comprising silver oxide prepared from 1.02 g of silver nitrate in a usual way, and 0.6 g of sodium hydroxide dissolved in 12 ml of water.

After completion of the dropwise addition, stirring is continued for 40 minutes and the precipitated silver is separated by filtration. The aqueous layer is extracted with ether to remove the unreacted materials, adjusted to pH 5.2 with dilute hydrochloric acid, and extracted with ether. On removing the ether, colorless cystals are obtained and then they are recrystallized from ligroin-hexane (1 : 2) to yield 5-(4'-chloro-n-butyl)picolinic acid. Yield: 0.58 g (52 percent).

EXAMPLE 3

Synthesis of 5-(5'-chloro-n-pentyl)picolinic acid

A mixture of 1.97 g of 2-methyl-5-(5'-chloropentyl)pyridine, 3.18 g of benzaldehyde, and 3.16 g of acetic anhydride is heated at 160°C for 24 hours. After being cooled, the reaction mixture is acidified by addition of dilute hydrochloric acid, and steam is introduced into the acidified mixture to remove the unreacted benzaldehyde by distillation. The residue is made alkaline and extracted with ether. The ethereal layer is washed with water, dried over potassium carbonate, and distilled in vacuo to obtain 1.1 g of an oily matter boiling at 160°–165°C./0.5 mmHg. The molecular weight was determined from the massspectrum to be 285, and the oily matter was confirmed to be a 2-styryl derivative. In 20 ml of acetone, is dissolved 1.1g of the styryl derivative and to the resulting solution is added 2.15 g of potassium permanganate portionwise while maintaining at 5° to 10°C. After completion of the addition, the mixture is stirred at 10° to 15°C. for 3 hours. The precipitated manganese dioxide is separated by filtration and washed with acetone. The filtrate and washings are combined and treated in the same manner as in Example 1 to obtain crude 5-(5'-chloro-n-pentyl)picolinic acid. Yield: 440 mg (50 percent). On recrystallization from ligroin, a purified product melting at 113°–114°C. is obtained.

EXAMPLE 4

Synthesis of 5-(5'-chloro-n-pentyl)picolinic acid

In 50 ml of pyridine, are suspended 4 g of 2-methyl-5-(5'-chloro-n-pentyl)pyridine and 3.3 g of selenium dioxide, and stirred under reflux for 3 hours. The metallic selenium precipitated is separated by filtration and washed with water. Steam is introduced into the reaction mixture to remove the pyridine by distillation. The aqueous solution is decolorized with activated carbon and evaporated to dryness. The residue is recrystallized from ligroin to obtain 5-(5'-chloro-n-pentyl)picolinic acid having a melting point of 113°–114°C. Yield: 1,85 g (41 percent).

REFERENTIAL EXAMPLE 1

Synthesis of 2-methyl-5-(3'-chloro-n-propyl)pyridine

A mixture of 4.08 g of 2-methyl-5-(3'-hydroxy-n-propyl)pyridine, 5.15 g of p-toluenesulfonyl chloride, and 15 ml of anhydrous pyridine is stirred at 40°C. for 10 hours. The reaction mixture is poured into 50 ml of ice water and extracted four times with 30 ml of ether. The ethereal layers are combined, washed three times with 30 ml of water, dried over anhydrous potassium carbonate, and freed from the ether by distillation. The residue is distilled in vacuo to obtain 3.1 g of 2-methyl-5-(3'-chloro-n-proply)pyridine. Boiling point: 84°C/0.6 mmHg.

| | |
|---|---|
| NMR | $\gamma$ 1.67 (1H d 0.4 ppm) |
| | $\gamma$ 2.64 (1H dd 0.4 ppm 1.3 ppm) |
| | $\gamma$ 2.96 (1H d 1.3 ppm) |
| | $\gamma$ 6.51 (2H t 1.1 ppm) |
| | $\gamma$ 7.27 (2H t 1.1 ppm) |
| | $\gamma$7.50 (3H s) |
| | $\gamma$ 7.93 (2H m) |
| MS' | $M^+$ 169 |
| | Main fragment peak 77 106 |
| | (which shows existence of one chlorine atom) |

Melting point of picrate: 137°– 138°C.
Elmentary analysis of picrate:

| | Calculated ($C_{15}H_{13}N_4O_7Cl$) | Found |
|---|---|---|
| C % | 45.18 | 44.92 |
| H % | 3.79 | 3.69 |
| N % | 14.05 | 14.33 |

In a similar manner as above, compounds shown in Table 3 were synthesized.

Table 3

| Starting material | End product | Boiling point (°C.) (mmHg) | Yield (%)[1] | Formula[2] (melting point) | Analysis (%)[2] Found (calculated) | | |
|---|---|---|---|---|---|---|---|
| 2-Methyl-5-hydroxy-alkylpyridine | 2-Methyl-5-halo-alkylpyridine | | | | C | H | N |
| H₃C-N-(CH₂)₂-CHCH₃ OH | H₃C-N-(CH₂)₂-CHCH₃ Cl | 72 (2) | 68 | $C_{16}H_{17}N_4O_7Cl$ (131 – 132°C) | 45.56 (46.38) | 4.15 (4.12) | 13.57 (13.83) |
| H₃C-N-(CH₂)₄OH | H₃C-N-(CH₂)₄F | 74 (0.85) | 51 | $C_{16}H_{17}N_4O_7F$ (122 – 123°C) | 48.49 (48.22) | 4.32 (4.28) | 14.14 (14.39) |
| H₃C-N-(CH₂)₄OH | H₃C-N-(CH₂)₄Cl | 80 (0.15) | 87 | $C_{16}H_{17}N_4O_7Cl$ (114 – 115°C) | 46.56 (46.40) | 4.15 (4.18) | 13.57 (13.74) |
| H₃C-N-(CH₂)₄OH | H₃C-N-(CH₂)₄Br | 90 (0.10) | 62 | $C_{16}H_{17}N_4O_7Br$ (132 – 133°C) | 46.33 (46.55) | 4.00 (4.15) | 13.35 (13.57) |

Note:
[1] Yield (%) of the end product.
[2] As Picrate.

REFERENTIAL EXAMPLE 2

Synthesis of 2-methyl-5-(3'-chloro-n-propyl)-pyridine

To a mixed solution comprising 4.08 g of 2-methyl-5-(3'-hydroxy-n-propyl)pyridine and 2.35 g of anhydrous pyridine, while being cooled in ice, is added dropwise 3.38 g of thionyl chloride at the temperature not exceeding 40°C. The solution becomes dark brown. After completion of the addition, the solution is stirred at room temperature for 3 hours and the reaction mixture is poured into 30 ml of ice water. After addition of 2 ml of concentrated aqueous ammonia, the mixture is extracted three times with 20 ml of ether. The ether layer is washed with 20 ml of water, dried over anhydrous potassium carbonate, and freed from the ether by distillation. The residue is distilled in vacuo to obtain 2.73 g of 2-methyl-5-(3'-chloro-n-propyl)pyridine. Upon identification, the product was found to be the same substance as 2-methyl-5-(3'-chloro-n-propyl)pyridine obtained in Referential Example 1.

REFERENTIAL EXAMPLE 3

Synthesis of 2-methyl-5-(5'-chloro-n-pentyl)-pyridine

To 600 ml of liquid ammonia, is added 150 mg of ferric nitrate, followed by, while being stirred, gradual addition of 12.7 g of metallic sodium cut to small pieces. After completion of the addition, gray sodium amide deposits in about 30 minutes. To the mixture, is added 58.6 g of 2-methyl-5-ethynylpyridine in small portions. After the addition, stirring is continued for 3 hours. To the reaction mixture, is added dropwise 158 g of 1-bromo-3-chloropropane. After completion of the addition, stirring is continued for 4 hours, and then the liquid ammonia is removed under reduced pressure. To the residue, is added 500 ml of water and extracted 4 times with 200 ml of ether. The ethereal layer is extracted with dilute hydrochloric acid. The hydrochloric acid layer is washed with 200 ml of ether, made alkaline with aqueous ammonia while being cooled in ice, and extracted three times with 200 ml of ether. The ethereal layer is dried over anhydrous potassium carbonate and freed from the ether by distillation. The oily residue is dissolved in 300 ml of methyl alcohol and reduced in an autoclave in the presence of Raney nickel under a hydrogen pressure of 50 kg/cm² at 30° to 50°C. for 2 hours. After separation of the Raney nickel by filtration, the methyl alcohol is removed from the reaction mixture by distillation. The residue is distilled in vacuo to obtain 63 g (65 percent yield) of 2-methyl-5-(5'-chloro-n-pentyl)pyridine as a colorless oil boiling at 97°–98°C/0.15 mmHg.

Melting point of picrate: 107°–108°C
Elementary analysis of picrate:

|  | Calculated ($C_{17}H_{19}N_4O_7Cl$) | Found |
| --- | --- | --- |
| C % | 47.84 | 47.99 |
| H % | 4.49 | 4.46 |
| N % | 13.13 | 13.18 |

REFERENTIAL EXAMPLE 4

Synthesis of 2-methyl-5-(6'-chloro-n-hexyl)-pyridine

To 10 ml of anhydrous tetrahydrofuran, is added 1.15 g of metallic sodium in thread form followed by dropwise addition of 5.85 g of 2-methyl-5-ethynylpyridine dissolved in 10 ml of anhydrous tetrahydrofuran. After completion of the addition, stirring is continued for 5 hours under reflux. Then, to the mixture is added 13 g of 4-chlorobutyl p-toluenesulfonate. The mixture is stirred for 2 hours under reflux, transferred into 50 ml of ice water, and extracted with ether. The ethereal layer is treated in the same manner as in Referential Example 1 to obtain 2-methyl-5-(6'-chloro-n-hexyl)-pyridine in a yield of 57 percent. Boiling point: 101°C/0.09 mmHg.

REFERENTIAL EXAMPLE 5

Synthesis of 2-methyl-5-(5'-fluoro-n-pentyl)-pyridine

A mixture of 6.65 g of 2-methyl-5-(5'-chloro-n-pentyl)pyridine, 20 g of diethylene glycol, and 3.0 g of diethylene glycol, and 3.0 g of potassium fluoride is allowed to react with stirring at 135°C. for 25 hours. After being cooled by standing, the reaction mixture is added with 30 ml of water and extracted four times with 20 ml of ether. The ethereal layer is washed witth 50 ml of water, dried over anhydrous potassium carbonate, and freed from the ether by distillation. The residue is distilled under reduced pressure to obtain 2.38 g (39 percent yield) off colorless 2-methyl-5-(5'-fluoro-n-pentyl)pyridine boiling at 68°C/0.2 mmHg.

What is claimed is:

1. A 5-(haloalkyl)picolinic acid represented by the general formula,

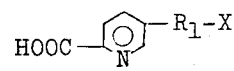

wherein $R_1$ represents an alkylene group having 3 to 6 carbon atoms and X represents a halogen atom, provided that the halogen atom is attached to the terminal carbon atom of the carbon chain or to the carbon atom at position 3' in the case of a four-carbon chain.

2. A compound according to claim 1, wherein the 5-(haloalkyl)picolinic acid is a 5-(halo-n-butyl)picolinic acid represented by the general formula,

wherein X represents a halogen atom.

3. A compound according to claim 1, wherein the 5-(haloalkyl)picolinic acid is 5-(chloro-n-butyl)picolinic acid represented by the formula,

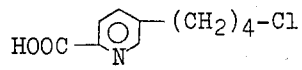

* * * * *

UNITED STATES PATENT OFFICE
CERTIFICATE OF CORRECTION

Patent No. 3,862,159          Dated January 21, 1975

Inventor(s) Hamao Umezawa et al

It is certified that error appears in the above-identified patent and that said Letters Patent are hereby corrected as shown below:

In the title page, the assignee "Zaiden Hojin Biseibutsu Kagaku Kenkyu Kai" has been corrected to -- Zaidan Hojin Biseibutsu Kagaku Kenkyu Kai --.

In the foreign application priority data, the following has been inserted -- December 5, 1972   Japan................ 47-121884 --

Signed and sealed this 15th day of July 1975.

(SEAL)
Attest:

RUTH C. MASON
Attesting Officer

C. MARSHALL DANN
Commissioner of Patents
and Trademarks

Disclaimer 3,862,159.—*Hamao Umezawa* and *Tomio Takeuchi*, Tokyo, *Koichi Miyano*, Omiya, *Hiroaki Hamano*, Higashi-Murayama, and *Wataru Tanaka*, Hoya, Japan. 5-(HALOALKYL)PICOLINIC ACID AND DERIVATIVES. Patent dated Jan. 21, 1975. Disclaimer filed Mar. 19, 1976, by the assignee, *Zaidan Hojin Biseibutsu Kagaku Kenkyu Kai*.

Hereby enters this disclaimer to claim 1 of said patent.

[*Official Gazette May 25, 1976.*]